(12) United States Patent
Henry et al.

(10) Patent No.: US 11,985,355 B2
(45) Date of Patent: May 14, 2024

(54) METHODS AND DEVICES FOR ENCODING AND DECODING A DATA STREAM REPRESENTING AT LEAST ONE IMAGE

(71) Applicant: ORANGE, Issy-les-Moulineaux (FR)

(72) Inventors: Félix Henry, Chatillon (FR); Pierrick Philippe, Chatillon (FR); Mohsen Abdoli, Chatillon (FR); Gordon Clare, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/277,938

(22) PCT Filed: Sep. 3, 2019

(86) PCT No.: PCT/FR2019/052023
§ 371 (c)(1),
(2) Date: Mar. 19, 2021

(87) PCT Pub. No.: WO2020/058593
PCT Pub. Date: Mar. 26, 2020

(65) Prior Publication Data
US 2022/0046287 A1 Feb. 10, 2022

(30) Foreign Application Priority Data
Sep. 21, 2018 (FR) ...................... 1858572

(51) Int. Cl.
*H04N 19/70* (2014.01)
*H04N 19/105* (2014.01)
(Continued)

(52) U.S. Cl.
CPC ........... *H04N 19/70* (2014.11); *H04N 19/105* (2014.11); *H04N 19/176* (2014.11); *H04N 19/182* (2014.11)

(58) Field of Classification Search
CPC .... H04N 19/70; H04N 19/105; H04N 19/176; H04N 19/182; H04N 19/147;
(Continued)

(56) References Cited

U.S. PATENT DOCUMENTS 9,253,508 B2    2/2016  Gao et al.
2008/0225947 A1*  9/2008  Narroschke ............ H04N 19/19
                                                    375/E7.076
(Continued)

FOREIGN PATENT DOCUMENTS

WO   WO-2007079964 A1 *  7/2007  ........... H04N 19/103
WO   WO-2015197945 A1 * 12/2015  ........... H04N 19/103
WO      2017059044 A1    4/2017

OTHER PUBLICATIONS

Abdoli et al. "Intra Prediction Using In-Loop Residual Coding for the post-HEVC Standard"MMSO 2017—IEEE 19th International Workshop on Multimedia Signal Processing—Luton, United Kingdom (Year: 2017).*

(Continued)

*Primary Examiner* — Richard A Hansell, Jr.
(74) *Attorney, Agent, or Firm* — David D. Brush; Westman, Champlin & Koehler, P.A.

(57) ABSTRACT

A method for decoding a coded data stream representative of at least one image that is split into blocks. For at least one block of the image, referred to as the current block, an item of information indicating a coding mode of the current block is decoded from the data stream. When the coding mode of the current block corresponds to a first coding mode, decoding a prediction residue associated with the current block using a first group of syntax elements. When the coding mode of the current block corresponds to a second coding mode, decoding the prediction residue associated with the current block using a second group of syntax elements, (Continued)

Figure 1:
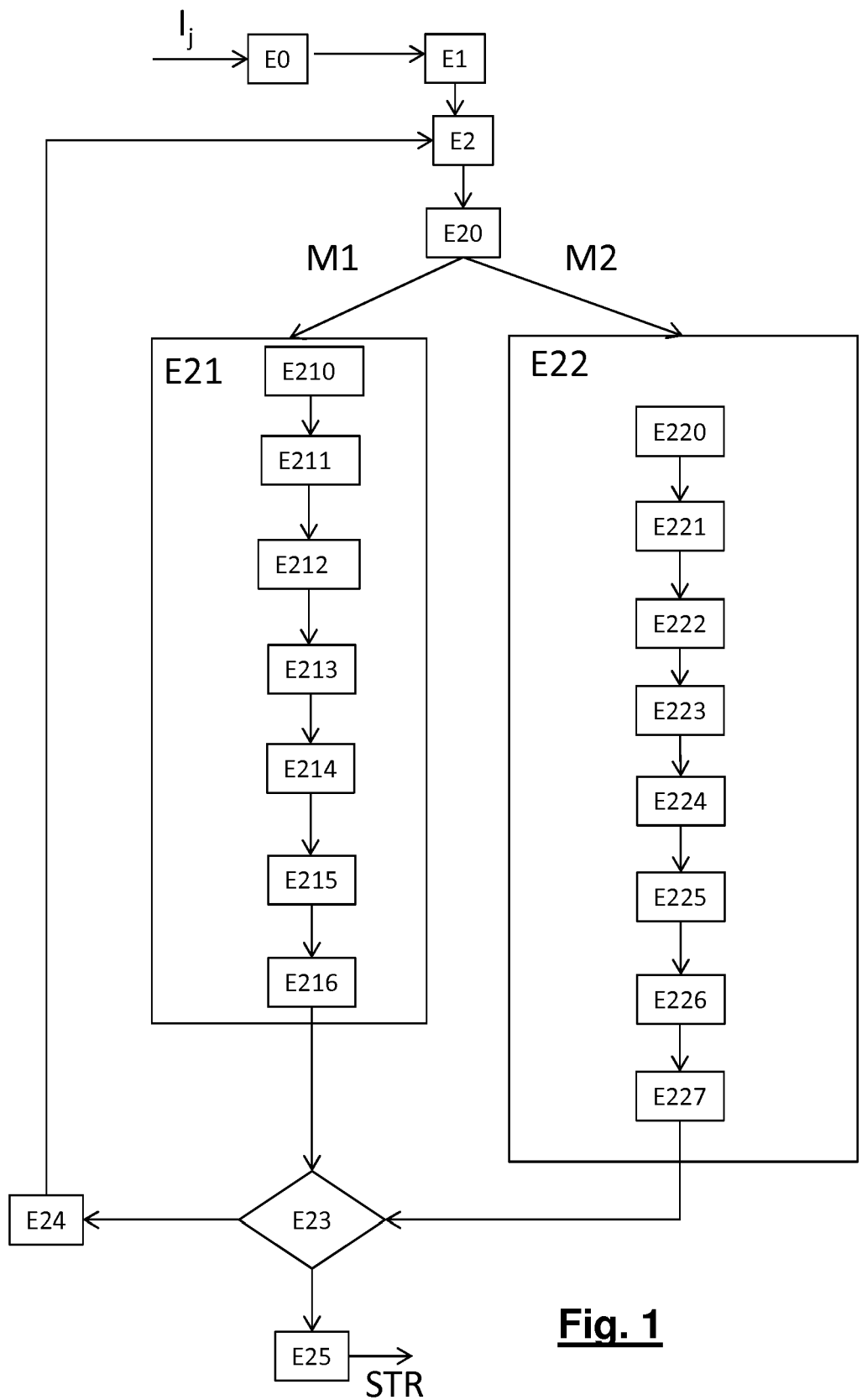

which is a subgroup of syntax elements of the first group of syntax elements.

14 Claims, 4 Drawing Sheets

(51) Int. Cl.
*H04N 19/176* (2014.01)
*H04N 19/182* (2014.01)

(58) Field of Classification Search
CPC .... H04N 19/11; H04N 19/119; H04N 19/129; H04N 19/157; H04N 19/593
See application file for complete search history.

(56) References Cited

U.S. PATENT DOCUMENTS

| | | | | |
|---|---|---|---|---|
| 2010/0189180 | A1* | 7/2010 | Narroschke | H04N 19/147 375/E7.246 |
| 2011/0038410 | A1* | 2/2011 | Narroschke | H04N 19/70 375/240.03 |
| 2015/0181237 | A1* | 6/2015 | Tsukuba | H04N 19/134 382/233 |
| 2016/0269730 | A1* | 9/2016 | Jeon | H04N 19/127 |
| 2018/0278958 | A1* | 9/2018 | Hsiang | H04N 19/60 |
| 2021/0152823 | A1* | 5/2021 | Park | H04N 19/176 |

OTHER PUBLICATIONS

Akula et al. Joint video Exploration Team (JVET) of ITU-T SG 16 WP 3 and ISO/IEC JTC 1/SC 29/WG 11 10th Meeting: San Diego, US, Apr. 10-20, 2018 (Year: 2018).*
Matthias Wien, "High Efficiency Video Coding, Coding Tools and Specification", Signals and Communication Technology, 2015.
English translation of the Written Opinion of the International Searching Authority dated Nov. 25, 2019 for corresponding International Application No. PCT/FR2019/052023, filed Sep. 3, 2019.
International Search Report dated Nov. 18, 2019 for corresponding International Application No. PCT/FR2019/052023, Sep. 3, 2019.
Written Opinion of the International Searching Authority dated Nov. 18, 2019 for corresponding International Application No. PCT/FR2019/052023, filed Sep. 3, 2019.
Abdoli Mohsen et al. "Intra prediction using in-loop residual coding for the post-HEVC standard" 2017 IEEE 19th International Workshop On Multimedia Signal Processing (MMSP), IEEE, Oct. 16, 2017 (Oct. 16, 2017), pp. 1-6, DOI: 10.1109/MMSP.2017.8122241, XP033271573.
Chen H et al. "Description of SDR, HDR and 360° video coding technology proposal by Huawei, GoPro, HiSilicon, and Samsung" "general application scenario" 10. JVET Meeting; Oct. 4, 2018-Apr. 20, 2018; San Diego; (The Joint Video Exploration Team of ISO/IEC JTC1/SC29/WG11 and ITU-T SG.16); URL: http://phenix.int-evry.fr/jvet/m no. JVET-J0025-v4, Apr. 14, 2018 (Apr. 14, 2018), XP030151192.
Office Action from corresponding Japanese Patent Application No. 2021-515494, dated Aug. 28, 2023.
Hiroshi Okubo, et al., "Impress Standard Textbook Series H.265/HEVC Textbook" [Unofficial translation], First Edition, Japan, Impress Japan Corporation, Oct. 21, 2013,pp. 173-185.
Abdoli, Mohsen et al., Intra Prediction Using In-Loop Residual Coding for the post-HEVC Standard, Proc. IEEE 19th International Workshop on Multimedia Signal Processing 2017, United Kingdom, IEEE, Nov. 30, 2017, pp. 1-6, [online], [retrieved on Aug. 23, 2023], Retrieved from the Internet: <URL: https://ieeexplore.ieee.org/document/8122241>.
Chen, Huanbang et al., Description of SDR, HDR and 360°Video Coding Technology Proposal by Huawei, GoPro, HiSilicon, and Samsung, JVET-J0025 (version 4), ITU, Apr. 14, 2018, p. 86, [online], [retrieved on Aug. 23, 2023], Retrieved from the Internet: <URL: https://jvet-experts.org/doc_end_user/documents/10_San%20Diego/wg11/JVET-J0025-v4.zip>, JVET-J0025_v3.docx.
Sole, Joel et al., CE6.c: Harmonization of HE Residual Coding with Non-Square Block Transforms, JCTVC-G322 (version 2), ITU, Nov. 21, 2011, pp. 1-6, [online], [retrieved on Aug. 23, 2023], Retrieved from the Internet: <URL: http://phenix.it-sudparis.eu/jct/doc_end_user/documents/7_Geneva/wg11/JCTVC-G322-v2.zip> JCTVC-G322_r1.docx.

* cited by examiner

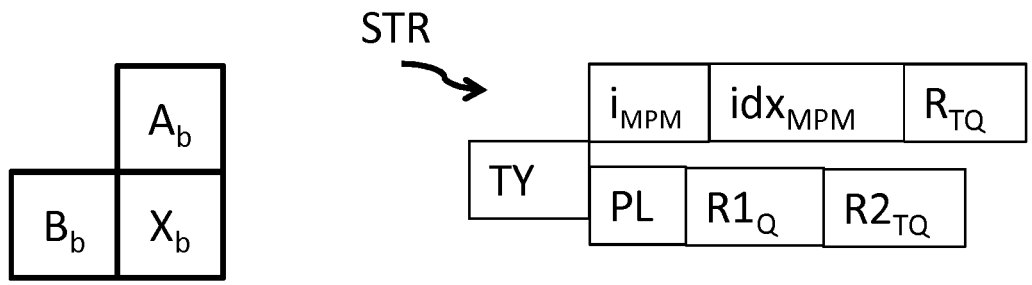
Fig. 2
Fig. 5
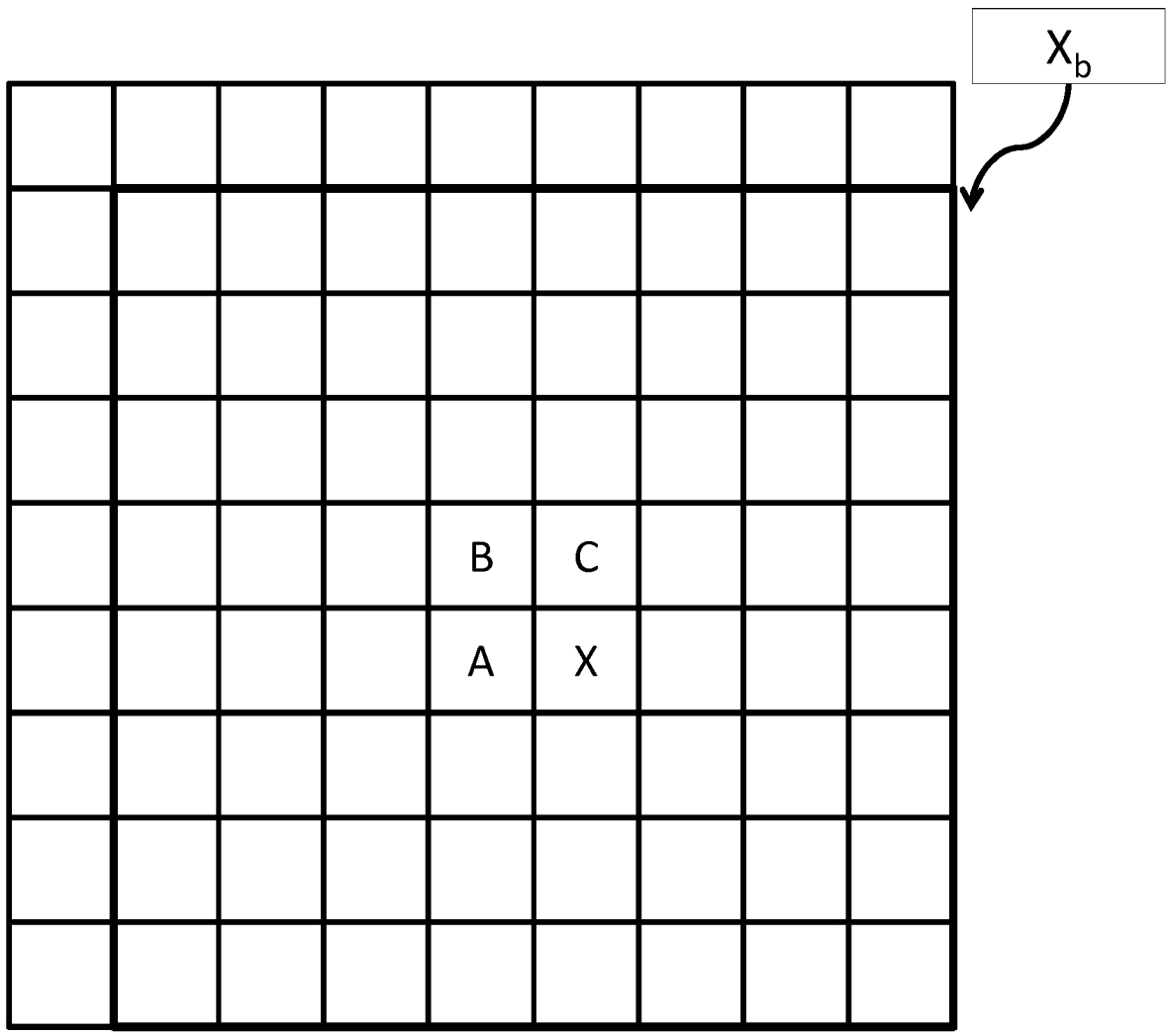
Fig. 3

METHODS AND DEVICES FOR ENCODING AND DECODING A DATA STREAM REPRESENTING AT LEAST ONE IMAGE

CROSS-REFERENCE TO RELATED APPLICATIONS

This Application is a Section 371 National Stage Application of International Application No. PCT/FR2019/052023, filed Sep. 3, 2019, which is incorporated by reference in its entirety and published as WO 2020/058593 A1 on Mar. 26, 2020, not in English.

1. FIELD OF THE INVENTION

The field of the invention is that of encoding and decoding images or sequences of images, and in particular video streams.

More specifically, the invention relates to the compression of images or sequences of images using a block representation of the images.

The invention can notably be applied to the image or video coding implemented in the current or future encoders (JPEG, MPEG, H.264, HEVC, etc. and their amendments), and to the corresponding decoding.

2. PRIOR ART

Digital images and sequences of images take up a lot of space in terms of memory, which requires, when transmitting these images, to compress them in order to avoid congestion problems on the network used for this transmission.

Many techniques for compressing video data are already known. Among these, the HEVC compression standard ("High Efficiency Video Coding, Coding Tools and Specification", Matthias Wien, Signals and Communication Technology, 2015) proposes to implement a prediction of pixels of a current image in relation to other pixels belonging to the same image (intra prediction) or to a previous or subsequent image (inter prediction).

More specifically, the intra prediction uses the spatial redundancies within an image. To do this, the images are split into blocks of pixels. The blocks of pixels are then predicted using already reconstructed information, corresponding to the previously coded/decoded blocks in the current image according to the scanning order of the blocks in the image.

Furthermore, in a standard manner, the coding of a current block is carried out using a prediction of the current block, referred to as the predictor block, and a prediction residue or "residual block", corresponding to a difference between the current block and the predictor block. The resulting residual block is then transformed, for example using a DCT (discrete cosine transform) type transform. The coefficients of the transformed residual block are then quantized, coded by entropy coding and transmitted to the decoder, that can reconstruct the current block by adding this residual block to the predictor block.

The decoding is done image by image, and for each image, block by block. For each block, the corresponding elements of the stream are read. The inverse quantization and the inverse transform of the coefficients of the residual block are performed. Then, the block prediction is calculated to obtain the predictor block, and the current block is reconstructed by adding the prediction (i.e. the predictor block) to the decoded residual block.

In U.S. Pat. No. 9,253,508, a DPCM (Differential Pulse Code Modulation) coding technique for coding blocks in intra mode is integrated into an HEVC encoder. Such a technique consists in predicting a set of pixels of an intra block by another set of pixels of the same block that have been previously reconstructed. In U.S. Pat. No. 9,253,508, a set of pixels of the intra block to be coded corresponds to a row of the block, or a column, or a row and a column, and the intra prediction used to predict the set of pixels is one of the directional intra predictions defined in the HEVC standard.

However, such a technique is not optimal. Indeed, the reconstruction of a set of pixels of the intra block corresponds either to the addition of a prediction residue in the case of a lossless coding, thus offering a fairly low compression ratio, or to the addition of a prediction residue after inverse transform and/or inverse quantization of said other set of pixels serving as a prediction. Such a technique thus does not enable each pixel of the intra block to be predicted using a local prediction function and the predicted pixel to be reconstructed before a subsequent pixel is predicted. Indeed, this technique requires a set of pixels (row/column of the block for example) to be reconstructed to predict another set of pixels. In other words, with each prediction and reconstruction of a part of the block, several pixels of the block are predicted and reconstructed.

Moreover, in U.S. Pat. No. 9,253,508, it is not described how to make conventional intra prediction modes as defined in the HEVC standard for example and the DPCM prediction mode coexist.

There is therefore a need for a new coding and decoding method to improve the compression of image or video data.

3. SUMMARY OF THE INVENTION

The invention improves the state of the art. For this purpose, it relates to a method for decoding a coded data stream representative of at least one image that is split into blocks, the decoding method comprises, for at least one block of the image, referred to as the current block:
  decoding an item of information indicating a coding mode of the current block,
  when the coding mode of the current block corresponds to a first coding mode, decoding the current block comprising:
    decoding a prediction residue associated with the current block using a first group of syntax elements,
    obtaining a prediction of the current block from reconstructed pixels of a previously decoded block,
    reconstructing said current block from the prediction obtained and said decoded prediction residue;
  when the coding mode of the current block corresponds to a second coding mode, decoding the current block comprising:
    decoding the prediction residue associated with the current block using a second group of syntax elements, said second group being a subgroup of syntax elements of said first group of syntax elements,
    reconstructing said current block comprising:
      for each pixel of the current block:
        obtaining a prediction of said pixel from another previously decoded pixel, said other previously decoded pixel belonging to said current block or to a previously decoded block of the image, reconstructing said pixel from the prediction of said pixel obtained and the decoded prediction residue using the second group of syntax elements.

Thus, according to the invention, at least one part of the syntax elements of an existing coding mode can be used. This allows pooling the data processing, since the same processing unit can be used, and to reduce the implementation costs, both in terms of hardware and software.

It should be noted that according to the invention, the first group of syntax elements and the second group of syntax elements are distinct. Indeed, the second group of syntax elements being a subgroup of the first group, it comprises at least one syntax element of said first group. The second group of syntax elements differs from the first group in that it does not comprise all the syntax elements of the first group. Indeed, the second group of syntax elements comprises a number of syntax elements strictly lower than the number of syntax elements of the first group. Thus, the second group of syntax elements is a strict subgroup of the first group of syntax elements.

The invention thus adapts the coding of the prediction residue obtained according to the second coding mode to the statistic of the coefficients to be coded. Indeed, such a statistic differs from the statistic of the coefficients of the prediction residue obtained according to the first coding mode. The data compression is thus improved.

The invention also relates to a method for encoding a data stream representative of at least one image that is split into blocks. The encoding method comprises, for at least one block of the image, referred to as the current block:
coding an item of information indicating a coding mode of the current block,
when the coding mode of the current block corresponds to a first coding mode, coding the current block comprising:
obtaining a prediction of the current block from reconstructed pixels of a previously decoded block,
obtaining a prediction residue associated with the current block obtained from the prediction obtained,
coding said prediction residue associated with the current block using a first group of syntax elements,
when the coding mode of the current block corresponds to a second coding mode, coding the current block comprising:
for each pixel of the current block:
obtaining a prediction of said pixel from another previously decoded pixel, said other previously decoded pixel belonging to said current block or to a previously decoded block of the image,
obtaining a prediction residue from the prediction obtained for said pixel,
coding a prediction residue associated with the current block comprising the prediction residues associated with the pixels of said current block, using a second group of syntax elements, said second group being a subgroup of syntax elements of said first group of syntax elements.

The invention also relates to a coded data stream representative of at least one image that is split into blocks. The coded data stream comprises, for at least one block of the image, referred to as the current block:
an item of information indicating a coding mode of the current block,
when the coding mode of the current block corresponds to a first coding mode, a prediction residue according to the first coding mode coded using a first group of syntax elements, the prediction residue according to the first coding mode being obtained from a prediction of the current block from reconstructed pixels of a previously decoded block,
when the coding mode of the current block corresponds to a second coding mode, a prediction residue according to the second coding mode coded using a second group of syntax elements, said second group being a subgroup of syntax elements of said first group of syntax elements, said prediction residue according to the second coding mode being obtained by:
for each pixel of the current block:
obtaining a prediction of said pixel from another previously decoded pixel, said other previously decoded pixel belonging to said current block or to a previously decoded block of the image,
obtaining a prediction residue associated with said pixel from the prediction obtained for said pixel.

Such a data stream can be stored on any storage medium, for example a memory, or transmitted in the form of an electrical or optical signal, that can be carried via an electrical or optical cable, by radio or by other means.

According to a particular embodiment of the invention, the first group of syntax elements comprises location syntax elements indicating the location of a first non-null coefficient of the prediction residue associated with said current block, according to a determined scanning order of the coefficients of said prediction residue, and said second group of syntax elements does not comprise said location syntax elements.

When decoding or encoding the prediction residue of the current block according to the first coding mode, the prediction residue is scanned from the first non-null coefficient of the prediction residue to the last coefficient of the prediction residue according to said determined scanning order.

According to the particular embodiment described here, when decoding or coding the prediction residue of the current block according to the second coding mode, the prediction residue is then scanned from the first coefficient of the prediction residue to the last coefficient of the prediction residue according to said determined scanning order. This particular embodiment of the invention reduces the coding cost of the prediction residue according to the second coding mode when the first non-null coefficient corresponds to the first coefficient of the prediction residue.

According to another particular embodiment of the invention, the prediction residue associated with the current block comprising at least one sub-block of coefficients, said first group of syntax elements comprises a sub-block syntax element associated with said at least one sub-block of coefficients, said sub-block syntax element indicating whether at least one coefficient of the sub-block is non-null, and for each sub-block of coefficients of the prediction residue comprising at least one non-null coefficient, a significance syntax element for each coefficient of the sub-block, said significance syntax element indicating whether or not said coefficient is null. According to this other particular embodiment of the invention, the second group of syntax elements comprises a significance syntax element for each coefficient of the prediction residue.

In other words, according to this particular embodiment of the invention, according to the second coding mode, the coefficients of the prediction residue associated with the current block are not grouped by sub-block and the sub-block syntax element is not comprised in the second group of syntax elements.

According to another particular embodiment of the invention, the first group of syntax elements comprises, for each non-null coefficient of the prediction residue scanned according to a determined scanning order:
- a syntax element indicating whether or not the absolute value of the coefficient is equal to 1,
- for each coefficient for which the absolute value of the coefficient is not equal to 1, a syntax element indicating whether or not the absolute value of the coefficient is equal to 2,
- for each coefficient for which the absolute value of the coefficient is neither equal to 1 nor to 2, a syntax element indicating the absolute value of the coefficient minus 3,
- a syntax element indicating whether the coefficient is positive or negative.

According to this other particular embodiment of the invention, the second group of syntax elements comprises for each non-null coefficient of the prediction residue scanned according to a determined scanning order a syntax element indicating the absolute value of the coefficient, and said syntax element indicating whether the coefficient is positive or negative.

The invention also relates to a decoding device configured to implement the decoding method according to any one of the particular embodiments defined above. This decoding device could, of course, comprise the different characteristics relating to the decoding method according to the invention. Thus, the characteristics and advantages of this decoding device are the same as those of the decoding method, and they are not detailed further.

The decoding device comprises in particular a processor configured, for at least one block of the image, referred to as the current block, to:
- decode an item of information indicating a coding mode of the current block,
- when the coding mode of the current block corresponds to a first coding mode, decode the current block by:
  - decoding a prediction residue associated with the current block using a first group of syntax elements,
  - obtaining a prediction of the current block from reconstructed pixels of a previously decoded block,
  - reconstructing said current block from the prediction obtained and said decoded prediction residue;
- when the coding mode of the current block corresponds to a second coding mode, decode the current block by:
  - decoding the prediction residue associated with the current block using a second group of syntax elements, said second group being a subgroup of syntax elements of said first group of syntax elements,
  - reconstructing said current block comprising:
    - for each pixel of the current block:
      - obtaining a prediction of said pixel from another previously decoded pixel, said other previously decoded pixel belonging to said current block or to a previously decoded block of the image,
      - reconstructing said pixel from the prediction of said pixel obtained and the decoded prediction residue using the second group of syntax elements.

According to a particular embodiment of the invention, such a decoding device is comprised in a terminal.

The invention also relates to an encoding device configured to implement the coding method according to any one of the particular embodiments defined above. This encoding device could, of course, comprise the different characteristics relating to the coding method according to the invention. Thus, the characteristics and advantages of this coding device are the same as those of the coding method, and they are not detailed further.

The encoding device comprises in particular a processor configured, for at least one block of the image, referred to as the current block, to:
- code an item of information indicating a coding mode of the current block,
- when the coding mode of the current block corresponds to a first coding mode, code the current block by:
  - obtaining a prediction of the current block from reconstructed pixels of a previously decoded block,
  - obtaining a prediction residue associated with the current block obtained from the prediction obtained,
  - coding said prediction residue associated with the current block using a first group of syntax elements;
- when the coding mode of the current block corresponds to a second coding mode, code the current block by:
  - for each pixel of the current block:
    - obtaining a prediction of said pixel from another previously decoded pixel, said other previously decoded pixel belonging to said current block or to a previously decoded block of the image,
    - obtaining a prediction residue from the prediction obtained for said pixel,
  - coding a prediction residue associated with the current block comprising the prediction residues associated with the pixels of said current block, using a second group of syntax elements, said second group being a subgroup of syntax elements of said first group of syntax elements.

According to a particular embodiment of the invention, such a coding device is comprised in a terminal, or a server.

The decoding method, respectively the encoding method, according to the invention can be implemented in various ways, notably in wired form or in software form. According to a particular embodiment of the invention, the decoding method, respectively the coding method, is implemented by a computer program. The invention also relates to a computer program comprising instructions for implementing the decoding method or the coding method according to any one of the particular embodiments previously described, when said program is executed by a processor. Such a program can use any programming language. It can be downloaded from a communication network and/or recorded on a computer-readable medium.

This program can use any programming language, and can be in the form of source code, object code, or intermediate code between source code and object code, such as in a partially compiled form, or in any other desirable form.

The invention also relates to a computer-readable storage medium or data medium comprising instructions of a computer program as mentioned above. The recording media mentioned above can be any entity or device able to store the program. For example, the medium can comprise a storage means such as a memory. On the other hand, the recording media can correspond to a transmissible medium such as an electrical or optical signal, that can be carried via an electrical or optical cable, by radio or by other means. The program according to the invention can be downloaded in particular on an Internet-type network.

Alternatively, the recording media can correspond to an integrated circuit in which the program is embedded, the circuit being adapted to execute or to be used in the execution of the method in question.

4. LIST OF FIGURES

Figure 4:
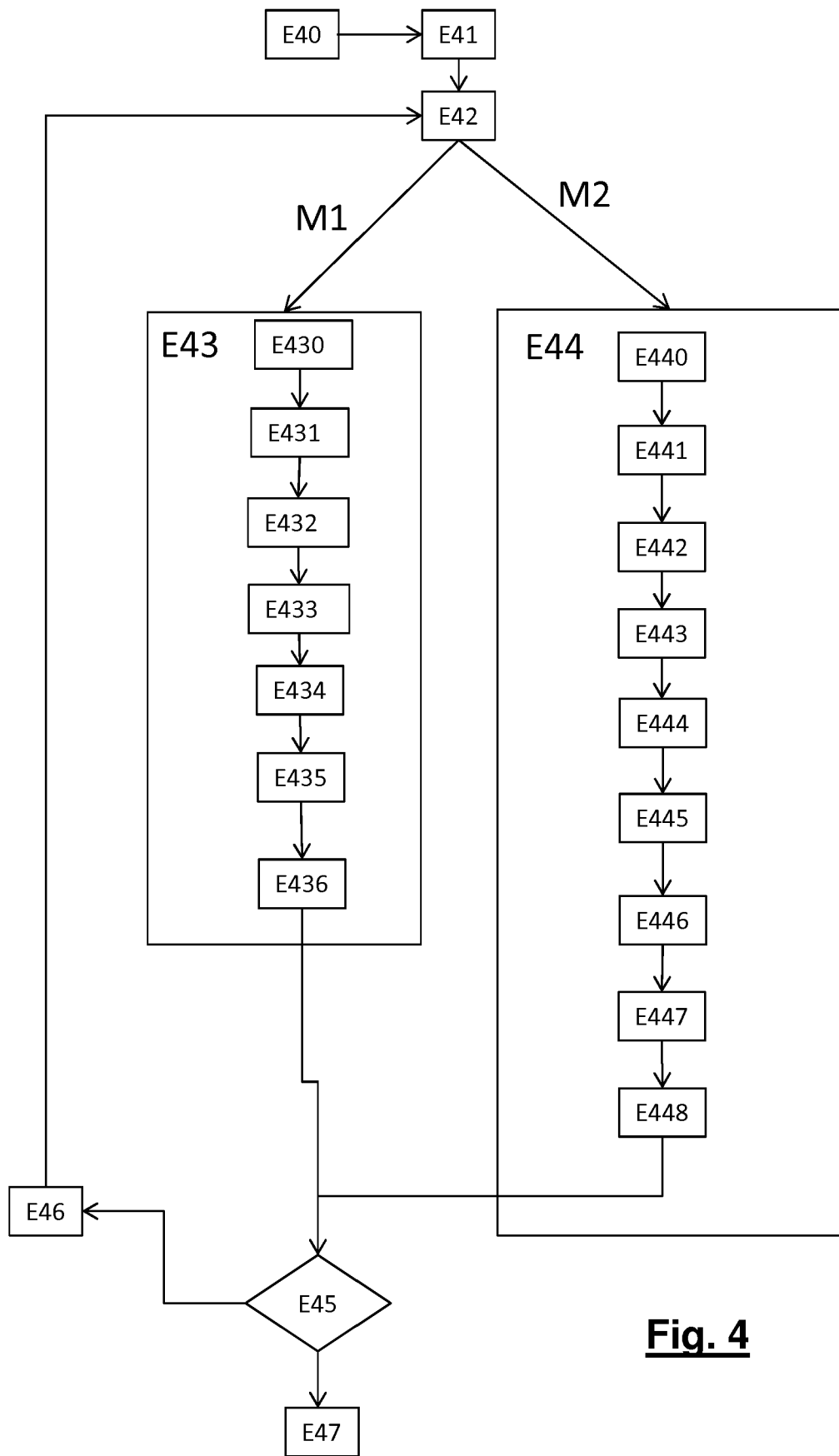
Figure 6:
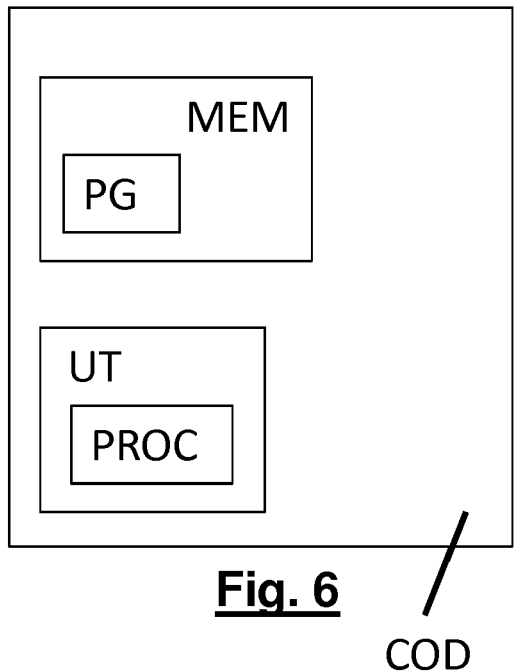
Figure 8:
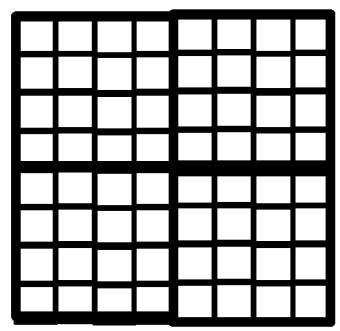
Figure 7:
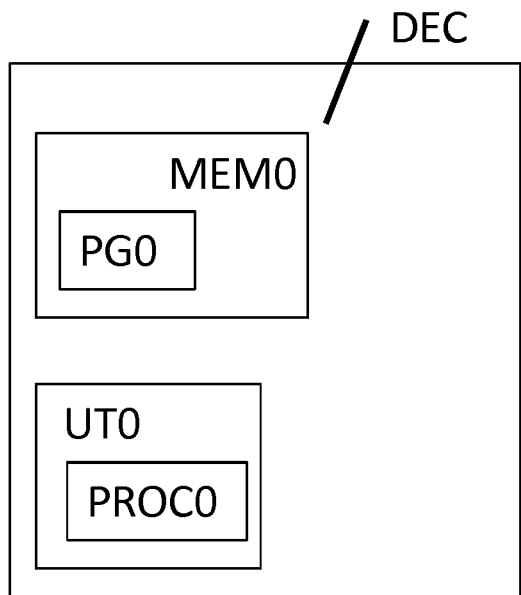

Other characteristics and advantages of the invention will emerge more clearly upon reading the following description of a particular embodiment, provided as a simple illustrative non-restrictive example, and the annexed drawings, wherein:

FIG. 1 shows steps of the coding method according to a particular embodiment of the invention, FIG. 2 illustrates a position example of the neighbouring blocks of a current block to determine an intra prediction mode according to a particular embodiment of the invention, FIG. 3 illustrates a position example of the reference pixels used to predict pixels of a current block according to a particular embodiment of the invention, FIG. 4 shows steps of the decoding method according to a particular embodiment of the invention, FIG. 5 illustrates a signal example comprising coded data representative of at least one block of an image according to a particular embodiment of the invention, FIG. 6 shows the simplified structure of a coding device adapted to implement the coding method according to any one of the particular embodiments of the invention, FIG. 7 shows the simplified structure of a decoding device adapted to implement the decoding method according to any one of the particular embodiments of the invention, FIG. 8 illustrates splitting the block of coefficients into sub-blocks.

5. DESCRIPTION OF AN EMBODIMENT OF THE INVENTION

5.1 General Principle

The general principle of the invention is to allow the use of one part of a group of syntax elements used to code a prediction residue obtained from a coding mode using a prediction of the pixels from at least one previously reconstructed block, to code a prediction residue from a pixel-based intra prediction, i.e. a prediction of the pixels of the block to be coded from previously reconstructed pixels of the block to be coded.

The invention thus improves the compression performance of the pixel-based intra coding mode and reduces the implementation costs of this new coding mode, in particular by making it possible to reuse one part of the syntax elements already used by another coding mode.

5.2 EMBODIMENTS

FIG. 1 shows steps of the coding method according to a particular embodiment of the invention. For example, a sequence of images $I_1, I_2, \ldots, I_{Nb}$ is coded in the form of a coded data stream STR according to a particular embodiment of the invention. For example, such a coding method is implemented by a coding device as described later in relation to FIG. 6.

A sequence of images $I_1, I_2, \ldots, I_{Nb}$, Nb being the number of images of the sequence to be coded, is provided as input of the coding method. The coding method outputs a coded data stream STR representative of the sequence of images provided as input.

In a known manner, the coding of the sequence of images $I_1, I_2, \ldots, I_{Nb}$ is done image by image according to a coding order previously established and known to the encoder. For example, the images can be coded in the temporal order $I_1, I_2, \ldots, I_{Nb}$ or in another order, for example $I_1, I_3, I_2, \ldots, I_{Nb}$.

In a step E0, an image $I_j$ to be coded of the sequence of images $I_1, I_2, \ldots, I_{Nb}$ is split into blocks, for example into blocks of size 32×32 or 64×64 pixels or more. Such a block can be subdivided into square or rectangular sub-blocks, for example 16×16, 8×8, 4×4, 16×8, 8×16 . . .

In a step E1, a first block or sub-block $X_b$ to be coded of the image $I_j$ is selected according to a predetermined scanning order of the image $I_j$. For example, it can be the first block in the lexicographical scanning order of the image.

In a step E2, the encoder will choose the coding mode to code the current block $X_b$.

According to the particular embodiment described here, the encoder selects the coding mode to code the current block $X_b$ from a first coding mode M1 and a second coding mode M2. Additional coding modes (not described here) can be used.

According to the particular embodiment described here, the first coding mode M1 corresponds to the coding of the current block by conventional intra prediction, for example as defined according to the HEVC standard, and the second coding mode M2 corresponds to the In-Loop Residual (ILR) prediction coding.

In step E2, the encoder can perform a rate/distortion optimisation to determine the best coding mode to code the current block. During this rate/distortion optimisation, additional coding modes distinct from the first and the second coding modes can be tested, for example an inter mode coding mode. During this rate/distortion optimisation, the encoder simulates the coding of the current block $X_b$ according to the different available coding modes in order to determine the rate and the distortion associated with each coding mode and selects the coding mode offering the best rate/distortion compromise, for example according to the D+λR function, where R is the rate required to code the current block according to the evaluated coding mode, D is the distortion measured between the decoded block and the original current block, and λ is a Lagrangian multiplier, for example entered by the user or defined at the encoder.

In a step E20, an item of information indicating the coding mode selected for the current block is coded in the data stream STR.

If the current block $X_b$ is coded according to the first coding mode M1, the method proceeds to step E21 for coding the block according to M1. If the current block $X_b$ is coded according to the second coding mode M2, the method proceeds to step E22 for coding the block according to M2.

Step E21 for coding the block according to the first coding mode M1, according to a particular embodiment of the invention, is described below. According to the particular mode described here, the first coding mode corresponds to a conventional intra prediction, such as the one defined in the HEVC standard.

In a step E210, a quantization step $\delta_1$ is determined. For example, the quantization step $\delta_1$ can be set by the user, or calculated using a quantization parameter setting a compromise between compression and quality and entered by the user or defined by the encoder. Thus, such a quantization parameter can be the parameter λ, used in the rate-distortion cost function D+λ.R, where D represents the distortion introduced by the coding and R the rate used for coding. This function is used to make coding choices. Typically, a way of coding the image that minimises this function is sought.

As a variant, the quantization parameter can be QP, corresponding to the quantization parameter conventionally used in the AVC or HEVC standards. Thus, in the HEVC standard, the quantization step $\delta_1$ is determined by the equation $\delta_1 = \text{levelScale}[QP \%6]<<(QP/6))$ where levelScale[k]={40, 45, 51, 57, 64, 72} for k=0..5.

In a step E211, a prediction of the current block is determined using a conventional intra prediction mode. According to this conventional intra prediction, each predicted pixel is calculated only from the decoded pixels originating from the neighbouring blocks (reference pixels) located above the current block, and to the left of the current block. The way the pixels are predicted from the reference pixels depends on a prediction mode that is transmitted to the decoder, and that is chosen by the encoder from a predetermined set of modes known to the encoder and the decoder.

Thus, in HEVC there are 35 possible prediction modes: 33 modes that interpolate the reference pixels in 33 different angular directions, and 2 other modes: the DC mode in which each pixel of the predicted block is produced from the average of the reference pixels, and the PLANAR mode, that performs a planar and non-directional interpolation. This "conventional intra prediction" is well known and also used in the ITU-T H.264 standard (where there are only 9 different modes) as well as in the experimental JEM software available at the Internet address (https://jvet.hhi.fraunhofer.de/), where there are 67 different prediction modes. In all cases, the conventional intra prediction respects the two aspects mentioned above (prediction of the pixels from the neighbouring blocks and transmission to the decoder of an optimal prediction mode).

In step E211, the encoder thus chooses one of the available prediction modes from the predetermined list of prediction modes. One way to choose consists for example in evaluating all the prediction modes and keeping the prediction mode that minimises a cost function such as, classically, the rate-distortion cost.

In a step E212, the prediction mode chosen for the current block is coded from the neighbouring blocks of the current block. FIG. 2 shows a position example of the neighbouring blocks Ab and Bb of the current block $X_b$ to code the prediction mode of the current block $X_b$.

In step E212, the intra prediction mode chosen for the current block is coded using the intra prediction modes associated with the neighbouring blocks.

For example, the approach described in the HEVC standard for coding the prediction mode of the current block can be used. In the example in FIG. 2, such an approach consists in identifying the intra prediction mode $m_A$ associated with the block Ab located above the current block, and the intra prediction mode $m_B$ associated with the block Bb located just to the left of the current block. Depending on the value of $m_A$ and $m_B$, a list called MPM (for Most Probable Mode), containing 3 intra prediction modes, and a list called non-MPM, containing the 32 other prediction modes, are created.

According to the HEVC standard, in order to code the intra prediction mode of the current block, syntax elements are transmitted:
  a binary indicator indicating if the prediction mode to be coded for the current block is in the MPM list or not,
  if the prediction mode of the current block belongs to the MPM list, an index in the MPM list corresponding to the prediction mode of the current block is coded,
  if the prediction mode of the current block does not belong to the MPM list, an index in the non-MPM list corresponding to the prediction mode of the current block is coded.

In a step E213, the prediction residue R for the current block is constructed.

In step E213, in a standard manner, a predicted block P is constructed according to the prediction mode chosen in step E211. Then, the prediction residue R is obtained by calculating the difference for each pixel between the predicted block P and the original current block.

In a step E214, the prediction residue R is transformed into $R_T$.

In step E214, a frequency transform is applied to the residue block R in order to produce the block $R_T$ comprising transform coefficients. The transform could be a DCT-type transform for example. It is possible to choose the transform to be used from a predetermined set of transforms E T and to inform the decoder of the transform used.

In a step E215, the transformed residue block $R_T$ is quantized using for example a scalar quantization with quantization step $\delta_1$. This produces the quantized transformed prediction residue block $R_{TQ}$.

In a step E216, the coefficients of the quantized block $R_{TQ}$ are coded by an entropy encoder.

For example, the entropy coding specified in the HEVC standard can be used.

In this case, the coding of the coefficients of the residue $R_{TQ}$ works as follows.

A scanning order of the coefficients is determined. This scanning order is the same at the encoder and at the decoder. It is for example defined by default in the encoder and the decoder. It consists for example in scanning the current quantized block $R_{TQ}$ row by row and column by column.

Syntax elements are transmitted to indicate the location of the first non-null coefficient encountered according to the scanning order. These syntax elements will be called LastX and LastY (indicating the coordinates of said coefficient in the current quantized block $R_{TQ}$). The coefficients are then scanned from said first non-null coefficient to the last coefficient of the current quantized block $R_{TQ}$. The coefficients of the current quantized block $R_{TQ}$ are grouped into sub-blocks. For example, the coefficients are grouped into sub-blocks of size 4×4 contained in the current quantized block $R_{TQ}$, as shown in FIG. 8 showing a transformed prediction residue block split into sub-blocks of 4×4 coefficients. Other sizes of sub-blocks are of course possible.

For each sub-block, a syntax element coded_sub_block_flag is transmitted, indicating whether that sub-block consists entirely of zeros or not. In other words, this syntax element takes the value 0 if all the coefficients of the sub-block are null and the value 1 otherwise (at least one coefficient of the subgroup is different from 0).

For each sub-block comprising at least one non-null coefficient, a syntax element sig_coeff_flag is transmitted for each coefficient (located after the last coefficient of the sub-block indicated by LastX and LastY according to the determined scanning order), this syntax element indicating whether the coefficient is null or not. Such a syntax element is not transmitted for the first non-null coefficient identified by LastX and LastY since the encoder already knows that this coefficient is non-null.

For each non-null coefficient, a syntax element coeff_abs_level_greater1_flag is transmitted, indicating whether or not the coefficient is equal to 1.

For each coefficient that is non-null and not equal to 1, a syntax element coeff_abs_level_greater2_flag is transmitted, indicating whether or not the coefficient is equal to 2.

For each coefficient that is non-null and not equal to 1 and not equal to 2, a syntax element coeff_abs_level_remaining is transmitted, indicating the amplitude of the coefficient minus 3.

Finally, for each non-null coefficient, a syntax element coeff_sign_flag is transmitted in order to indicate whether the coefficient is positive or negative.

In a known manner, the current block is decoded by dequantizing the coefficients of the quantized block $R_{TQ}$, then applying the inverse transform to the dequantized coefficients to obtain the decoded prediction residue. The prediction is then added to the decoded prediction residue in order to reconstruct the current block and obtain its decoded version. The decoded version of the current block can then be used later to spatially predict other neighbouring blocks of the image or to predict blocks of other images by inter-image prediction.

Step E22 for coding the block according to the second coding mode M2, according to a particular embodiment of the invention, is described below. According to the particular embodiment described here, the second coding mode corresponds to an ILR prediction coding.

In a step E220, a local predictor PL for the current block is determined. According to the coding mode described here, the pixels of the current block are predicted by previously reconstructed pixels of a neighbouring block of the current block or of the current block itself.

Preferably, for the prediction, pixels that are as close as possible to the pixel to be predicted are chosen. This is why it is referred to as a local predictor. The local predictor PL can also be assimilated to a prediction mode of the current block associated with the second coding mode M2. According to this interpretation, in the particular embodiment described here, the first coding mode uses a first group of intra prediction modes, for example the intra prediction modes defined by the HEVC standard, and the second coding mode, here the ILR mode, uses a second group of prediction modes distinct from the first group of intra prediction modes.

The local predictor PL can be unique or it can be selected from a set of predetermined local predictors (second group of prediction modes).

According to an embodiment variant, 4 local predictors are defined. Thus, if we call X a current pixel to be predicted from the current block, A the pixel located immediately to the left of X, B the pixel located immediately to the left of and above X, C the pixel located immediately above X, as illustrated in FIG. 3 showing a current block $X_b$, 4 local predictors PL1, PL2, PL3, PL4 can be defined as follows:

PL1(X)=min(A,B) if C≥max(A,B)
max(A,B) if C≤min(A,B)
A+B−C otherwise
PL2(X)=A
PL3(X)=B
PL4(X)=C where min(A,B) corresponds to the function returning the smallest value between the value of A and the value of B and max(A,B) corresponds to the function returning the largest value between the value of A and the value of B.

In step E220, the local predictor PL used for the current block is determined. In other words, the same local predictor will be used for all the pixels of the current block, i.e. the same prediction function. For this purpose, several embodiment variants are possible.

The coding of the current block with each of the predictors can be simulated (similarly to an optimisation to choose a coding mode for the current block), and the local predictor that optimises a cost function (for example, that minimises the D+λ.R function, where R is the rate used to code the block, D is the distortion of the decoded block relative to the original block, and λ is a parameter set by the user) is selected.

Or, in order to limit the complexity of selecting a local predictor for the current block, an orientation of the texture of the previously coded pixels is analysed. For example, the previously coded pixels in the block that are located above or to the left of the current block are analysed using a Sobel-type operator. If it is determined that:

the orientation is horizontal, the local predictor PL2 is selected,
the orientation is vertical, the local predictor PL3 is selected,
the orientation is diagonal, the local predictor PL4 is selected,
if no orientation emerges, the local predictor PL1 is selected.

A syntax element is coded in the data stream STR to indicate to the decoder which local predictor was used to predict the current block.

In a step E221, a quantization step $\delta_2$ is determined. For example, the quantization step $\delta_2$ depends on the same quantization parameter as the quantization step $\delta_1$ that would be determined in step E210 if the current block was coded according to the first coding mode.

In a step E222, a prediction residue R1 is calculated for the current block. For this purpose, once the local predictor is chosen, for each current pixel of the current block:

the current pixel X of the current block is predicted by the selected local predictor PL, using either pixels outside the block and already reconstructed (and thus available with their decoded value), or pixels previously reconstructed in the current block, or both, in order to obtain a predicted value PRED. In all cases, the predictor PL uses previously reconstructed pixels. In FIG. 3, it can be seen that the pixels of the current block located on the first row and/or the first column of the current block will use as reference pixels (to construct the predicted value PRED) pixels outside the block and already reconstructed (pixels in grey in FIG. 3) and possibly already reconstructed pixels of the current block. For the other pixels of the current block, the reference pixels used to construct the predicted value PRED are located inside the current block;

the difference DIFF between PRED and X is quantized into a value Q(X), by a scalar quantizer with quantization step $\delta_2$, by Q(X)=ScalarQuant(DIFF)=ScalarQuant($\delta_2$, X-PRED), the scalar quantizer being for example a nearest-neighbour scalar quantizer such as:

$$ScalarQuant(\Delta, x) = \text{floor}\left(\frac{x + \frac{\Delta}{2}}{\Delta}\right).$$

Q(X) is the quantized residue associated with X. It is calculated in the spatial domain, i.e. calculated directly from the difference between the predicted value PRED of the pixel X and the original value of X. Such a quantized residue Q(X) for the pixel X is stored in a quantized prediction residue block $R1_Q$, that will be coded later;

the decoded predicted value P1(X) of X is calculated by adding to the predicted value PRED the dequantized value of the quantized residue Q(X). The decoded predicted value P1(X) of X is thus obtained by P1(X)= PRED+ScalarDequant($\delta_2$, Q(X)). For example, the nearest scalar quantization inverse function is given by: ScalarDequant(Δ, x)=Δ×x.

The decoded predicted value P1(X) thus makes it possible to predict possible pixels that remain to be processed in the current block. Moreover, the block P1 comprising decoded/reconstructed values of the pixels of the current block is the ILR predictor of the current block (as opposed to the conventional intra predictor).

The sub-steps described above are performed for all the pixels of the current block, in a scanning order that ensures that the pixels used for the prediction chosen from PL1, ..., PL4 are available.

According to an embodiment variant, the scanning order of the current block is the lexicographical order, i.e. from left to right, and from top to bottom.

According to another embodiment variant, several scanning orders of the current block can be used, for example:
the lexicographical order, or
scanning the first column from top to bottom, then the column just to the right of it, etc., or
scanning the diagonals one after the other.

According to this other variant, it is possible to simulate the coding cost associated with each of the scanning orders and to choose the best scanning order for the current block in terms of rate/distortion, then to code for the current block an item of information representative of the chosen scanning order.

At the end of step E222, the quantized residue block $R1_Q$ was determined. This quantized residue block $R1_Q$ must be coded for transmission to the decoder. The predictor P1 of the current block was also determined.

In a step E223, the quantized residue block $R1_Q$ is coded for transmission to the decoder. Any known approach such as the method described in HEVC can be used to code the quantized coefficients of a conventional prediction residue.

According to the particular embodiment of the invention described here, the values of the quantized residue block $R1_Q$ are coded with an entropy encoder in the data stream STR using at least one part of the syntax elements used to code a prediction residue from the coding mode M1.

To code the residue $R1_Q$, a subgroup of the group of syntax elements used for the residue $R_{TQ}$ is used.

Indeed, the statistic of the residue $R1_Q$ is different from that of the residue $R_{TQ}$. It is therefore necessary to adapt the entropy coding of the prediction residue $R1_Q$ to this particular statistic in order to maximize the compression. However, by being limited to a syntax that is a subset of the syntax transmitted for a residue $R_{TQ}$, it is possible to reuse the same software or hardware component, which is particularly interesting in terms of implementation cost.

According to an embodiment variant of the invention, the coding of the residue $R1_Q$ is done by omitting the syntax elements LastX and LastY and by systematically scanning all the quantized prediction residues of the quantized prediction residue block $R1_Q$.

In this case, the coding of the quantized prediction residues of the residue $R1_Q$ works as follows.

A scanning order of the quantized prediction residues is determined. The quantized prediction residues are scanned from the first quantized prediction residue of the quantized residue block $R1_Q$ to the last quantized prediction residue of the quantized residue block $R1_Q$. The rest of the entropy coding of the quantized prediction residues is similar to that described in the case of coding a transformed prediction residue from the coding mode M1.

These quantized prediction residues are grouped by sub-blocks, for example sub-blocks of size 4×4 contained in the current quantized residue block $R1_Q$. Other sizes of sub-blocks are of course possible.

For each sub-block, a syntax element coded_sub_block_flag is transmitted, indicating whether that sub-block consists entirely of zeros or not. For each sub-block that contains at least one non-null quantized prediction residue, a syntax element sig_coeff_flag is transmitted for each quantized prediction residue, this syntax element indicating whether the quantized prediction residue is null or not. For each non-null quantized prediction residue, a syntax element coeff_abs_level_greater1_flag is transmitted, indicating whether or not the quantized prediction residue is equal to 1. For each quantized prediction residue that is non-null and not equal to 1, a syntax element coeff_abs_level_greater2_flag is transmitted, indicating whether or not the quantized prediction residue is equal to 2. For each quantized prediction residue that is non-null and not equal to 1 and not equal to 2, a syntax element coeff_abs_level_remaining is transmitted, indicating the amplitude of the coefficient minus 3.

Finally, for each non-null coefficient, a syntax element coeff_sign_flag is transmitted in order to indicate whether the quantized prediction residue is positive or negative.

According to another variant of the particular embodiment described here, the coding of the quantized residue $R1_Q$ is done by omitting the syntax elements LastX and LastY and by systematically scanning all the quantized prediction residues of the quantized residue block $R1_Q$, and by omitting the element coded_sub_block_flag. A significance value sig_coeff_flag is therefore systematically coded for each quantized prediction residue of the quantized residue block $R1_Q$.

According to this variant, the coding of the quantized prediction residues of the residue $R1_Q$ works as follows. A scanning order of the quantized prediction residues is determined. The quantized prediction residues are scanned from said first quantized prediction residue of the quantized residue block $R1_Q$ to the last quantized prediction residue of the quantized residue block $R1_Q$ according to the determined scanning order. For this purpose, for each quantized prediction residue, a syntax element sig_coeff_flag is transmitted, this syntax element indicating whether or not the coefficient is null. For each non-null quantized prediction residue, a syntax element coeff_abs_level_greater1_flag is transmitted, indicating whether or not the quantized prediction residue is equal to 1. For each quantized prediction residue that is non-null and not equal to 1, a syntax element coeff_abs_level_greater2_flag is transmitted, indicating whether or not the quantized prediction residue is equal to 2. For each quantized prediction residue that is non-null and not equal to 1 and not equal to 2, a syntax element coeff_abs_level_remaining is transmitted, indicating the amplitude of the quantized prediction residue minus 3. Finally, for each non-null quantized prediction residue, a syntax element coeff_sign_flag is transmitted in order to indicate whether the quantized prediction residue is positive or negative.

According to another embodiment variant, the coding of the residue $R1_Q$ is only performed using the syntax elements coeff_abs_level_remaining and coeff_sign_flag. According to this variant, all the coefficients of the block are systematically scanned and the value of each quantized prediction residue is coded. The coding of the quantized prediction residues of the residue $R1_Q$ works as follows. A scanning order of the quantized prediction residues is determined. The quantized prediction residues are scanned from the first quantized prediction residue of the quantized residue block $R1_Q$ to the last quantized prediction residue of the quantized residue block $R1_Q$.

For this purpose, for each quantized prediction residue of the quantized residue block $R1_Q$, a syntax element coeff_abs_level_remaining is transmitted, indicating the amplitude of the quantized prediction residue, and for each non-null quantized prediction residue, a syntax element coeff_sign_flag is transmitted in order to indicate whether the quantized prediction residue is positive or negative.

It appears that according to all the embodiment variants described above, the coding of the prediction residue $R1_Q$ is performed from a group of syntax elements that is a non-empty and strict subset (i.e. not equal) of the syntax elements used for the "conventional" residue $R_{TQ}$.

According to a particular embodiment of the invention, it is possible to determine and code an additional prediction residue R2 from the ILR predictor obtained for the current block. The coding of an additional prediction residue R2 is, however, optional. It is indeed possible to simply code the current block by its predicted version P1 and the quantized residue $R1_Q$.

In order to code an additional prediction residue R2 for the current block, the following steps are implemented.

In a step E224, the difference R2 between the predictor P1 and the original current block $X_b$ is calculated to form an additional residue R2: $R2=X_b-P1$. The following steps correspond to the conventional coding steps for this residue R2.

In a step E225, the residue R2 is transformed using a frequency transform in order to produce the block of coefficients $R2_T$.

The transform can be a DCT-type transform for example. It is possible to choose the transform to be used from a predetermined set of transforms $E_{T2}$ and to inform the decoder of the transform used. In this case, the set $E_{T2}$ can be different from the set $E_T$, in order to adapt to the particular statistics of the residue R2.

In a step E226, the block of coefficients $R2_T$ is quantized, for example using a δ quantization step scalar quantization. This produces the block $R2_{TQ}$.

The quantization step δ can be set by the user; it can also be calculated using another parameter λ setting the compromise between compression and quality and entered by the user or the encoder. For example, the quantization step δ can correspond to the quantization step $δ_1$ or be determined similarly to it.

In a step E227, the coefficients of the quantized block $R2_{TQ}$, are then transmitted in a coded manner. For example, the coding specified in the HEVC standard can be used.

In a known manner, the current block is decoded by dequantizing the coefficients of the quantized block $R2_{TQ}$, then applying the inverse transform to the dequantized coefficients to obtain the decoded prediction residue. The prediction P1 is then added to the decoded prediction residue in order to reconstruct the current block and obtain its decoded version $X_{rec}$. The decoded version $X_{rec}$ of the current block can then be used later to spatially predict other neighbouring blocks of the image or to predict blocks of other images by inter-image prediction.

In a step E23, it is checked if the current block is the last block of the image to be processed by the coding method, taking into account the previously defined scanning order. If yes, the method proceeds to coding (step E25) the next image of the video, if any. If no, in a step E24, the subsequent block of the image to be processed is selected according to the previously defined scanning order of the image and the coding method proceeds to step E2, where the selected block becomes the current block to be processed.

FIG. 4 shows steps of the method for decoding a stream STR of coded data representative of a sequence of images $I_1$, $I_2$, . . . , $I_{Nb}$ to be decoded according to a particular embodiment of the invention.

For example, the data stream STR was generated via the coding method shown in relation to FIG. 1. The data stream STR is provided as input to a decoding device DEC, as described in relation to FIG. 7.

The decoding method decodes the stream image by image and each image is decoded block by block.

In a step E40, an image $I_j$ to be decoded is subdivided into blocks. Each block will undergo a decoding operation consisting in a series of steps that are detailed hereafter. Blocks can be the same size or different sizes.

In a step E41, a first block or sub-block $X_b$ to be decoded of the image $I_j$ is selected as the current block according to a predetermined scanning order of the image $I_j$. For example, it can be the first block in the lexicographical scanning order of the image.

In a step E42, an item of information indicating a coding mode for the current block is read from the data stream STR. According to the particular embodiment described here, this item of information indicates if the current block is coded according to a first coding mode M1 or according to a second coding mode M2. According to the particular embodiment described here, the first coding mode M1 corresponds to the conventional intra prediction coding of the current block, for example as defined according to the HEVC standard, and the second coding mode M2 corresponds to the In-Loop Residual (ILR) prediction coding.

In other particular embodiments, the item of information read from the stream STR can also indicate the use of other coding modes to code the current block (not described here).

The step E43 for decoding the current block when the current block is coded according to the first coding mode M1 is described below.

In a step E430, a quantization step $δ_1$ is determined. For example, the quantization step $δ_1$ is determined from the quantization parameter QP read in the data stream STR or similarly to what was done at the encoder. For example, the quantization step $δ_1$ can be calculated using the quantization parameter QP read in the data stream STR. For example, the quantization parameter QP can be the quantization parameter conventionally used in the AVC or HEVC standards. Thus, in the HEVC standard, the quantization step $δ_1$ is determined by the equation $δ_1=\text{levelScale}[QP \% 6]<<(QP/6))$ where levelScale[k]={40, 45, 51, 57, 64, 72} for k=0.5.

In a step E431, the prediction mode chosen to code the current block is decoded from the neighbouring blocks. For this purpose, as it was done at the encoder, the intra prediction mode chosen for the current block is coded using the intra prediction modes associated with the neighbouring blocks of the current block.

The construction of both MPM and non-MPM lists is strictly similar to what was done during coding. According to the HEVC standard, syntax elements of the following type are decoded:
  a binary indicator indicating if the prediction mode to be coded for the current block is in the MPM list or not,
  if the prediction mode of the current block belongs to the MPM list, an index in the MPM list corresponding to the prediction mode of the coded current block,
  if the prediction mode of the current block does not belong to the MPM list, an index in the non-MPM list corresponding to the prediction mode of the coded current block.

The binary indicator and the prediction mode index are thus read for the current block from the data stream STR, to decode the intra prediction mode of the current block.

In a step E432, the decoder constructs a predicted block P for the current block from the decoded prediction mode.

In a step E433, the decoder decodes the coefficients of the quantized block $R_{TQ}$ from the data stream STR, for example using the decoding specified in the HEVC standard.

In this case, the decoding of the coefficients of the residue $R_{TQ}$ works as follows. A scanning order of the coefficients is determined corresponding to the scanning order used at the encoder. Syntax elements LastX and LastY indicating the coordinates of the first non-null coefficient in the residue block $R_{TQ}$ according to the determined scanning order are decoded. The coefficients are scanned from the first non-null coefficient to the last coefficient of the block. For this purpose, these coefficients are grouped into sub-blocks of size 4×4 contained in the current quantized residue block $R_{TQ}$. For each sub-block, a syntax element coded_sub_block_flag is decoded, indicating whether that sub-block consists entirely of zeros or not. For each sub-block that contains at least one non-null coefficient, a syntax element sig_coeff_flag is decoded for each coefficient (located after the last coefficient of the block indicated by LastX and LastY), this syntax element indicating whether the coefficient is null or not. For each non-null coefficient, a syntax element coeff_abs_level_greater1_flag is decoded, indicating whether or not the coefficient is equal to 1. For each coefficient that is non-null and not equal to 1, a syntax element coeff_abs_level_greater2_flag is decoded, indicating whether or not the coefficient is equal to 2. For each coefficient that is non-null and not equal to 1 and not equal to 2, a syntax element coeff_abs_level_remaining is decoded, indicating the amplitude of the coefficient minus 3. Finally, for each non-null coefficient, a syntax element coeff_sign_flag is decoded in order to indicate whether the coefficient is positive or negative.

In a step E434, the decoded block $R_{TQ}$ is dequantized, for example using a scalar dequantization of quantization step $\delta_1$. This produces the block of dequantized coefficients $R_{TQD}$.

In a step E435, an inverse frequency transform is applied to the block of de-quantized coefficients $R_{TQD}$ in order to produce the decoded prediction residue block $R_{TQDI}$. The transform could be an inverse DCT-type transform for example. It is possible to choose the transform to be used from a predetermined set of transforms $E_{T1}$ by decoding an indicator from the data stream STR.

In a step E436, the current block is reconstructed from the predicted block P obtained in step E432 and the decoded residue block $R_{TQDI}$ obtained in step E435, in order to produce the decoded current block $X_{rec}$, by $X_{rec}=P+R_{TQDI}$.

The step E44 for decoding the current block when the current block is coded according to the second coding mode M2 is described below.

In a step E440, the local predictor PL used to predict the pixels of the current block is determined. In the case where only one predictor is available, the local predictor is, for example, set by default at the decoder level and no syntax element needs to be read from the stream STR to determine it.

In the case where several local predictors are available, for example the predictors PL1-PL4 described above, a syntax element is decoded from the data stream STR to identify which local predictor was used to predict the current block. The local predictor is thus determined from that decoded syntax element.

In a step E441, the quantization step $\delta_2$ is determined, similarly to what was done at the encoder.

In a step E442, the quantized residue $R1_Q$ is decoded from the data stream STR.

According to the particular embodiment of the invention described here, the values of the quantized residue block $R1_Q$ are decoded from the data stream STR using at least one part of the syntax elements used to decode a prediction residue from the coding mode M1. To decode the residue $R1_Q$, a subgroup of the group of syntax elements used for the residue $R_{TQ}$ is used. According to an embodiment variant, the decoding of the residue $R1_Q$ is done by omitting the syntax elements LastX and LastY and by systematically scanning all the quantized prediction residues of the quantized residue block $R1_Q$. In this case, the decoding of the quantized prediction residues of the residue $R1_Q$ works as follows. A scanning order of the quantized prediction residues is determined, corresponding to the scanning order determined at the encoder. The quantized prediction residues are scanned from the first quantized prediction residue of the quantized residue block $R1_Q$ to the last quantized prediction residue of the quantized residue block $R1_Q$. For this purpose, these quantized prediction residues are grouped into sub-blocks of size 4×4 contained in the current quantized residue block $R1_Q$. For each sub-block, a syntax element coded_sub_block_flag is decoded, indicating whether that sub-block consists entirely of zeros or not. For each sub-block that contains at least one non-null quantized prediction residue, a syntax element sig_coeff_flag is decoded for each quantized prediction residue, this syntax element indicating whether the quantized prediction residue is null or not. For each non-null coefficient, a syntax element coeff_abs_level_greater1_flag is decoded, indicating whether or not the quantized prediction residue is equal to 1. For each quantized prediction residue that is non-null and not equal to 1, a syntax element coeff_abs_level_greater2_flag is decoded, indicating whether or not the quantized prediction residue is equal to 2. For each quantized prediction residue that is non-null and not equal to 1 and not equal to 2, a syntax element coeff_abs_level_remaining is decoded, indicating the amplitude of the quantized prediction residue minus 3.

Finally, for each non-null quantized prediction residue, a syntax element coeff_sign_flag is decoded in order to indicate whether the quantized prediction residue is positive or negative.

According to an embodiment variant, the decoding of the residue $R1_Q$ is done by omitting the syntax elements LastX and LastY and by systematically scanning all the quantized prediction residues of the quantized residue block $R1_Q$, and by omitting the syntax element coded_sub_block_flag and therefore by systematically decoding a value for each quantized prediction residue of the block.

In this case, the decoding of the quantized prediction residues of the residue $R_{TQ}$ works as follows. A scanning order of the quantized prediction residues is determined. The quantized prediction residues are scanned from the first quantized prediction residue of the quantized residue block $R1_Q$ to the last quantized prediction residue of the quantized residue block $R1_Q$. For each quantized prediction residue, a syntax element sig_coeff_flag is decoded, this syntax element indicating whether the coefficient is null or not. For each non-null coefficient, a syntax element coeff_abs_level_greater1_flag is decoded, indicating whether or not the quantized prediction residue is equal to 1. For each quantized prediction residue that is non-null and not equal to 1, a syntax element coeff_abs_level_greater2_flag is decoded, indicating whether or not the quantized prediction residue is equal to 2. For each quantized prediction residue that is non-null and not equal to 1 and not equal to 2, a syntax element coeff_abs_level_remaining is decoded, indicating the amplitude of the quantized prediction residue minus 3. Finally, for each non-null quantized prediction residue, a syntax element coeff_sign_flag is decoded in order to indicate whether the quantized prediction residue is positive or negative.

According to another embodiment variant, the decoding of the residue $R1_Q$ is only done using the syntax elements coeff_abs_level_remaining and coeff_sign_flag. In this case, the decoding of the quantized prediction residues of the residue $R1_Q$ works as follows. A scanning order of the quantized prediction residues is determined. The quantized prediction residues are scanned from the first quantized prediction residue of the quantized residue block $R1_Q$ to the last quantized prediction residue of the quantized residue block $R1_Q$. For this purpose, for each coefficient a syntax element coeff_abs_level_remaining is decoded, indicating the amplitude of the quantized prediction residue, and for each non-null quantized prediction residue, a syntax element coeff_sign_flag is decoded in order to indicate whether the quantized prediction residue is positive or negative.

In a step E443, the quantized residue block $R1_Q$ is dequantized using the quantization step $\delta_2$, in order to produce the dequantized residue block $R1_{QD}$.

In a step E444, when the dequantized residue block Rico is obtained, the predicted block P1 is constructed using the local predictor PL determined in step E440.

In step E444, each pixel of the current block is predicted and reconstructed as follows:
- the current pixel X of the current block is predicted by the selected predictor PL, using either pixels outside the block and already reconstructed, or previously reconstructed pixels of the current block, or both, in order to obtain a predicted value PRED. In all cases, the predictor PL uses previously decoded pixels;
- the decoded predicted value P1(X) of the current pixel X is calculated by adding to the predicted value PRED the dequantized value of the prediction residue $R1_{QD}$, such that $P1(X)=PRED+R1_{QD}(X)$.

These steps are implemented for all the pixels of the current block, in a scanning order that ensures that the pixels used for the prediction chosen from PL1, . . . , PL4 are available.

For example, the scanning order is the lexicographical order (from left to right, then rows from top to bottom).

According to a particular embodiment of the invention, the predicted block P1 comprising the decoded predicted values P1(X) of each pixel of the current block forms here the decoded current block $X_{rec}$.

According to another particular embodiment of the invention, it is considered here that an additional prediction residue was coded for the current block. It is therefore necessary to decode this additional prediction residue in order to reconstruct the decoded version of the current block $X_{rec}$.

For example, this other particular embodiment can be activated or not by default at the encoder and decoder level. Or, an indicator can be coded in the data stream with the block level information to indicate for each block coded according to the ILR coding mode if an additional prediction residue is coded. Or further, an indicator can be coded in the data stream with the image or sequence of images level information to indicate for all the blocks of the image or of the sequence of images coded according to the ILR coding mode if an additional prediction residue is coded.

When an additional prediction residue is coded for the current block, in a step E445, the coefficients of the quantized prediction residue $R2_{TQ}$, are decoded from the data stream STR, using means adapted to those implemented at the encoder, for example the means implemented in an HEVC decoder.

In a step E446, the block of quantized coefficients $R2_{TQ}$, is dequantized, for example using a scalar dequantization of quantization step $\delta_1$. This produces the block of de-quantized coefficients $R2_{TQD}$.

In a step E447, an inverse frequency transform is applied to the block $R2_{TQD}$ in order to produce the decoded prediction residue block $R2_{TQDr}$.

The inverse transform could be an inverse DCT-type transform for example.

It is possible to choose the transform to be used from a predetermined set of transforms $E_{T2}$ and to decode the item of information informing the decoder of the transform to be used. In this case, the set $E_{T2}$ is different from the set $E_T$, in order to adapt to the particular statistics of the residue R2.

In a step E448, the current block is reconstructed by adding the predicted block P1 obtained in step E444 to the decoded prediction residue $R2_{TQDr}$.

In a step E45, it is checked if the current block is the last block of the image to be processed by the decoding method, taking into account the previously defined scanning order. If yes, the method proceeds to decoding (step E47) the next image of the video, if any. If not, in a step E46, the subsequent block of the image to be processed is selected according to the previously defined scanning order of the image and the decoding method proceeds to step E42, the selected block becoming the current block to be processed.

FIG. 5 illustrates a signal example STR comprising coded data representative of at least one block of an image according to a particular embodiment of the invention.

The signal STR comprises a coded indicator TY indicating for a block of an image a coding mode for that block. When the indicator TY indicates that the block is coded according to the second coding mode, here the ILR mode, the signal then comprises values of quantized prediction residues $R1_Q$ coded using a group of syntax elements that is a subgroup of the group of syntax elements used to code values of prediction residues from the first coding mode. Such a subgroup comprises syntax elements as described in relation to FIG. 1 or 4 when the current block is coded according to the second coding mode.

The signal possibly comprises coded values of quantized transformed prediction residues $R2_{TQ}$. When several local predictors are possible for the current block, the signal also comprises a local predictor PL coded indicator.

When the indicator TY indicates that the block is coded according to the first coding mode, here the conventional intra prediction mode, the signal then comprises values of quantized transformed prediction residues $R_{TQ}$ coded using a group of syntax elements as described in relation to FIG. 1 or 4 when the current block is coded according to the first coding mode, a binary indicator $i_{MpM}$ indicating whether the prediction mode to be coded for the current block is in the MPM list or not, and an index $idx_{MPM}$ indicating the index of the current block prediction mode in the corresponding list.

FIG. 6 shows the simplified structure of a coding device COD adapted to implement the coding method according to any one of the particular embodiments of the invention.

According to a particular embodiment of the invention, the steps of the coding method are implemented by computer program instructions. For this purpose, the coding device COD has the standard architecture of a computer and notably comprises a memory MEM, a processing unit UT, equipped for example with a processor PROC, and driven by the computer program PG stored in the memory MEM. The computer program PG comprises instructions for implementing the steps of the coding method as described above, when the program is executed by the processor PROC.

At initialisation, the code instructions of the computer program PG are for example loaded into a RAM memory (not shown) before being executed by the processor PROC. In particular, the processor PROC of the processing unit UT implements the steps of the coding method described above, according to the instructions of the computer program PG.

FIG. 7 shows the simplified structure of a decoding device DEC adapted to implement the decoding method according to any one of the particular embodiments of the invention.

According to a particular embodiment of the invention, the decoding device DEC has the standard architecture of a computer and notably comprises a memory MEMO, a processing unit UT0, equipped for example with a processor PROC0, and driven by the computer program PG0 stored in the memory MEMO. The computer program PG0 comprises instructions for implementing the steps of the decoding method as described above, when the program is executed by the processor PROC0.

At initialisation, the code instructions of the computer program PG0 are for example loaded into a RAM memory (not shown) before being executed by the processor PROC0. In particular, the processor PROC0 of the processing unit UT0 implements the steps of the decoding method described above, according to the instructions of the computer program PG0.

The invention claimed is:

1. A method for decoding a coded data stream representative of at least one image, said image being split into blocks, wherein the method comprises the following acts implemented by a decoding device for at least one block of the image, referred to as a current block:
    decoding an item of information indicating a coding mode of the current block,
    determining that the coding mode of the current block corresponds to a first coding mode or a second coding mode;
    when the coding mode of the current block corresponds to the first coding mode, decoding the current block comprising:
        decoding coefficients of a prediction residue associated with the current block using a first group of syntax elements, said prediction residue being in the frequency domain,
        obtaining a prediction of the current block from reconstructed pixels of a previously decoded block, and
        reconstructing said current block from the prediction obtained and said decoded prediction residue; and
    when the coding mode of the current block corresponds to the second coding mode, decoding the current block comprising:
        decoding a prediction residue associated with the current block using a second group of syntax elements, said second group comprising at least one syntax element of said first group but not all the syntax elements of said first group, said prediction residue being in the spatial domain and comprising quantized prediction residues associated with pixels of the current block, and
        reconstructing said current block comprising for each pixel of the current block:
            obtaining a prediction of said pixel from another previously reconstructed pixel, said other previously reconstructed pixel belonging to said current block or to a previously reconstructed block of the image,
            de-quantizing the quantized prediction residue associated with said pixel and comprised within the prediction residue associated with the current block and decoded using the second group of syntax elements, said quantized prediction residue associated with said pixel having been obtained by quantizing a difference between the prediction of said pixel and said pixel, and
            reconstructing said pixel from the prediction of said pixel obtained and from the de-quantized prediction residue associated with said pixel.

2. A method for encoding a data stream representative of at least one image, said image being split into blocks, the method comprises the following acts performed by a coding device for at least one block of the image, referred to as the current block:
    coding an item of information indicating a coding mode of the current block;
    determining that the coding mode of the current block corresponds to a first coding mode or a second coding mode;
    when the coding mode of the current block corresponds to the first coding mode, coding the current block comprising:
        obtaining a prediction of the current block from reconstructed pixels of a previously decoded block,
        obtaining a prediction residue associated with the current block obtained from the prediction obtained, said prediction residue being in the frequency domain, and
        coding coefficients of said prediction residue associated with the current block using a first group of syntax elements, and
    when the coding mode of the current block corresponds to the second coding mode, coding the current block comprising:
        for each pixel of the current block:
            obtaining a prediction of said pixel from another previously reconstructed pixel, said other previously reconstructed pixel belonging to said current block or to a previously reconstructed block of the image;
            obtaining a prediction residue associated with said pixel from the prediction obtained for said pixel as a difference between the prediction obtained for said pixel and said pixel,
            quantizing said prediction residue associated with said pixel, and
            de-quantizing said quantized prediction residue and reconstructing said pixel from said de-quantized prediction residue, and
        coding a prediction residue associated with the current block, said prediction residue being in the spatial domain and comprising the quantized prediction residues associated with the pixels of said current block, using a second group of syntax elements, said second group being a subgroup of syntax elements of said first group of syntax elements, said second group comprising at least one syntax element of said first group but not all the syntax elements of said first group.

3. The method according to claim 1, wherein:
    said first group of syntax elements comprises location syntax elements indicating the location of a first non-null coefficient of the prediction residue associated with said current block, according to a determined scanning order of the coefficients of said prediction residue, and said second group of syntax elements does not comprise said location syntax elements.

4. The method according to claim 1, wherein:
said prediction residue associated with the current block comprises at least one sub-block of coefficients, and said first group of syntax elements comprises:
a sub-block syntax element associated with said at least one sub-block of coefficients, said sub-block syntax element indicating whether at least one coefficient of the sub-block is non-null, and
for each sub-block of coefficients of the prediction residue comprising at least one non-null coefficient, a significance syntax element for each coefficient of the sub-block, said significance syntax element indicating whether said coefficient is null or not, and
said second group of syntax elements comprises a significance syntax element for each quantized prediction residue of the prediction residue.

5. The method according to claim 1, wherein:
said first group of syntax elements comprises, for each non-null coefficient of the prediction residue scanned according to a determined scanning order:
a syntax element indicating whether or not the absolute value of the coefficient is equal to 1,
for each coefficient for which the absolute value of the coefficient is not equal to 1, a syntax element indicating whether or not the absolute value of the coefficient is equal to 2,
for each coefficient for which the absolute value of the coefficient is neither equal to 1 nor to 2, a syntax element indicating the absolute value of the coefficient minus 3,
a syntax element indicating whether the coefficient is positive or negative, and
said second group of syntax elements comprises for each non-null quantized prediction residue of the prediction residue scanned according to a determined scanning order:
a syntax element indicating the absolute value of the quantized prediction residue, and
said syntax element indicating whether the quantized prediction residue is positive or negative.

6. A decoding device for decoding a coded data stream representative of at least one image, said image being split into blocks, wherein the decoding device comprises a processor configured, for at least one block of the image, referred to as the current block, to:
decode an item of information indicating a coding mode of the current block,
determine that the coding mode of the current block corresponds to a first coding mode or a second coding mode;
when the coding mode of the current block corresponds to the first coding mode, decode the current block by:
decoding coefficients of a prediction residue associated with the current block using a first group of syntax elements, said prediction residue being in the frequency domain,
obtaining a prediction of the current block from reconstructed pixels of a previously decoded block, and
reconstructing said current block from the prediction obtained and said decoded prediction residue; and
when the coding mode of the current block corresponds to the second coding mode, decode the current block by:
decoding a prediction residue associated with the current block using a second group of syntax elements, said second group being a subgroup of syntax comprising at least one syntax element of the first group but not all the syntax elements of the first group, said prediction residue being in the spatial domain and comprising quantized prediction residues associated with pixels of the current block, and
reconstructing said current block comprising:
for each pixel of the current block:
obtaining a prediction of said pixel from another previously reconstructed pixel, said other previously reconstructed pixel belonging to said current block or to a previously reconstructed block of the image,
de-quantizing the quantized prediction residue associated with said pixel and comprised within the prediction residue associated with the current block and decoded using the second group of syntax elements, said quantized prediction residue associated with said pixel having been obtained by quantizing a difference between the prediction of said pixel and said pixel, and
reconstructing said pixel from the prediction of said pixel obtained and from the de-quantized prediction residue associated with said pixel.

7. A coding device for encoding a data stream representative of at least one image, said image being split into blocks, wherein the coding device comprises a processor configured, for at least one block of the image, referred to as the current block, to:
code an item of information indicating a coding mode of the current block,
determine that the coding mode of the current block corresponds to a first coding mode or a second coding mode;
when the coding mode of the current block corresponds to the first coding mode, code the current block by:
obtaining a prediction of the current block from reconstructed pixels of a previously decoded block,
obtaining a prediction residue associated with the current block obtained from the prediction obtained, and
coding coefficients of said prediction residue associated with the current block using a first group of syntax elements, said prediction residue being in the frequency domain, and
when the coding mode of the current block corresponds to the second coding mode, code the current block by:
for each pixel of the current block:
obtaining a prediction of said pixel from another previously reconstructed pixel, said other previously reconstructed pixel belonging to said current block or to a previously reconstructed block of the image, and
obtaining a prediction residue associated with said pixel from the prediction obtained for said pixel as a difference between the prediction obtained for said pixel and said pixel,
quantizing said prediction residue associated with said pixel,
de-quantizing said quantized prediction residue and reconstructing said pixel from said de-quantized prediction residue, and
coding a prediction residue associated with the current block, said prediction residue being in the spatial domain and comprising the quantized prediction residues associated with the pixels of said current block, using a second group of syntax elements, said second group being a subgroup of syntax elements of said first group of syntax elements, said second group comprising at least one syntax element of said first group but not all the syntax elements of said first group.

8. A non-transitory computer-readable medium comprising instructions stored thereon for implementing a decoding method for decoding a coded data stream representative of at least one image, when said instructions are executed by a processor of a decoding device, said image being split into blocks, wherein the instructions configure the decoding device to implement the following acts for at least one block of the image, referred to as a current block:
 decoding an item of information indicating a coding mode of the current block,
 determining that the coding mode of the current block corresponds to a first coding mode or a second coding mode;
 when the coding mode of the current block corresponds to the first coding mode, decoding the current block comprising:
  decoding coefficients of a prediction residue associated with the current block using a first group of syntax elements, said prediction residue being in the frequency domain,
  obtaining a prediction of the current block from reconstructed pixels of a previously decoded block, and
  reconstructing said current block from the prediction obtained and said decoded prediction residue; and
 when the coding mode of the current block corresponds to the second coding mode, decoding the current block comprising:
  decoding a prediction residue associated with the current block using a second group of syntax elements, said second group being a subgroup of syntax comprising at least one syntax element of said first group but not all the syntax elements said the first group, said prediction residue being in the spatial domain and comprising quantized prediction residues associated with pixels of the current block, and
  reconstructing said current block comprising:
   for each pixel of the current block:
    obtaining a prediction of said pixel from another previously reconstructed pixel, said other previously reconstructed pixel belonging to said current block or to a previously reconstructed block of the image,
    de-quantizing the quantized prediction residue associated with said pixel and comprised within the prediction residue associated with the current block and decoded using the second group of syntax elements, said quantized prediction residue associated with said pixel having been obtained by quantizing a difference between the prediction of said pixel and said pixel, and
    reconstructing said pixel from the prediction of said pixel obtained and from the de-quantized decoded prediction residue associated with said pixel.

9. A non-transitory computer-readable medium comprising instructions stored thereon for implementing an encoding method for encoding a data stream representative of at least one image, when said instructions are executed by a processor of a coding device, said image being split into blocks, wherein the instructions configure the coding device to implement the following acts for at least one block of the image, referred to as the current block:
 coding an item of information indicating a coding mode of the current block,
 determining that the coding mode of the current block corresponds to a first coding mode or a second coding mode;
 when the coding mode of the current block corresponds to the first coding mode, coding the current block comprising:
  obtaining a prediction of the current block from reconstructed pixels of a previously decoded block,
  obtaining a prediction residue associated with the current block obtained from the prediction obtained, and
  coding coefficients of said prediction residue associated with the current block using a first group of syntax elements, said prediction residue being in the frequency domain, and
 when the coding mode of the current block corresponds to the second coding mode, coding the current block comprising:
  for each pixel of the current block:
   obtaining a prediction of said pixel from another previously reconstructed pixel, said other previously reconstructed pixel belonging to said current block or to a previously reconstructed block of the image,
   obtaining a prediction residue associated with said pixel from the prediction obtained for said pixel as a difference between the prediction obtained for said pixel and said pixel,
   quantizing said prediction residue associated with said pixel, and
   de-quantizing said quantized prediction residue and reconstructing said pixel from said de-quantized prediction residue, and
  coding a prediction residue associated with the current block, said prediction residue being in the spatial domain and comprising the quantized prediction residues associated with the pixels of said current block, using a second group of syntax elements, said second group being a subgroup of syntax elements of said first group of syntax elements, said second group comprising at least one syntax element of said first group but not all the syntax elements of said first group.

10. The method according to claim 2, wherein:
 said first group of syntax elements comprises location syntax elements indicating the location of a first non-null coefficient of the prediction residue associated with said current block, according to a determined scanning order of the coefficients of said prediction residue,
 and said second group of syntax elements does not comprise said location syntax elements.

11. The method according to claim 2, wherein:
 said prediction residue associated with the current block comprises at least one sub-block of coefficients, and said first group of syntax elements comprises:
 a sub-block syntax element associated with said at least one sub-block of coefficients, said sub-block syntax element indicating whether at least one coefficient of the sub-block is non-null, and
 for each sub-block of coefficients of the prediction residue comprising at least one non-null coefficient, a significance syntax element for each coefficient of the sub-block, said significance syntax element indicating whether said coefficient is null or not, and
 said second group of syntax elements comprises a significance syntax element for each quantized prediction residue of the prediction residue.

12. The method according to claim 2, wherein:
said first group of syntax elements comprises, for each non-null coefficient of the prediction residue scanned according to a determined scanning order:
a syntax element indicating whether or not the absolute value of the coefficient is equal to 1,
for each coefficient for which the absolute value of the coefficient is not equal to 1, a syntax element indicating whether or not the absolute value of the coefficient is equal to 2,
for each coefficient for which the absolute value of the coefficient is neither equal to 1 nor to 2, a syntax element indicating the absolute value of the coefficient minus 3,
a syntax element indicating whether the coefficient is positive or negative, and
said second group of syntax elements comprises for each non-null quantized prediction residue of the prediction residue scanned according to a determined scanning order:
a syntax element indicating the quantized prediction residue, and
said syntax element indicating whether the quantized prediction residue is positive or negative.

13. A method for decoding a coded data stream representative of at least one image, said image being split into blocks, wherein the method comprises the following acts implemented by a decoding device for at least one block of the image, referred to as a current block:
decoding an item of information indicating a coding mode of the current block,
determining that the coding mode of the current block corresponds to a first coding mode or a second coding mode;
when the coding mode of the current block corresponds to the first coding mode, decoding the current block comprising:
decoding coefficients of a prediction residue associated with the current block using a first group of syntax elements, said prediction residue being in the frequency domain,
obtaining a prediction of the current block from reconstructed pixels of a previously decoded block, and
reconstructing said current block from the prediction obtained and said decoded prediction residue; and
when the coding mode of the current block corresponds to the second coding mode, decoding the current block comprising:
decoding a prediction residue associated with the current block using a second group of syntax elements, said second group comprising at least one syntax element of said first group but not all the syntax elements of the first group, said prediction residue being in the spatial domain and comprising quantized prediction residues associated with pixels of the current block, and
reconstructing said current block comprising:
for each pixel of the current block:
obtaining a prediction of said pixel from another previously reconstructed pixel, said other previously reconstructed pixel belonging to said current block or to a previously reconstructed block of the image,
de-quantizing the quantized prediction residue associated with said pixel and comprised within the prediction residue associated with the current block and decoded using the second group of syntax elements, said quantized prediction residue associated with said pixel having been obtained by quantizing a difference between the prediction of said pixel and said pixel, and
reconstructing said pixel from the prediction of said pixel obtained and from the de-quantized prediction residue associated with said pixel,
wherein said prediction residue associated with the current block comprises at least one sub-block of coefficients, and said first group of syntax elements comprises:
a sub-block syntax element associated with said at least one sub-block of coefficients, said sub-block syntax element indicating whether at least one coefficient of the sub-block is non-null, and
for each sub-block of coefficients of the prediction residue comprising at least one non-null coefficient, a significance syntax element for each coefficient of the sub-block, said significance syntax element indicating whether said coefficient is null or not, and
wherein said second group of syntax elements comprises a significance syntax element for each quantized prediction residue.

14. A method for encoding a data stream representative of at least one image, said image being split into blocks, the method comprises the following acts performed by a coding device for at least one block of the image, referred to as the current block:
coding an item of information indicating a coding mode of the current block, determining that the coding mode of the current block corresponds to a first coding mode or a second coding mode;
when the coding mode of the current block corresponds to the first coding mode, coding the current block comprising:
obtaining a prediction of the current block from reconstructed pixels of a previously decoded block, said prediction residue being in the frequency domain,
obtaining a prediction residue associated with the current block obtained from the prediction obtained, and
coding coefficients of said prediction residue associated with the current block using a first group of syntax elements, and
when the coding mode of the current block corresponds to the second coding mode, coding the current block comprising:
for each pixel of the current block:
obtaining a prediction of said pixel from another previously decoded pixel, said other previously decoded pixel belonging to said current block or to a previously decoded block of the image, and
obtaining a prediction residue from the prediction obtained for said pixel as a difference between the prediction obtained for said pixel and said pixel,
quantizing said prediction residue associated with said pixel,
de-quantizing said quantized prediction residue and reconstructing said pixel from said de-quantized prediction residue, and
coding a prediction residue associated with the current block, said prediction residue being in the spatial domain and comprising the prediction residues associated with the pixels of said current block, using a second group of syntax elements, said second group comprising at least one syntax element of said first group but not all the syntax elements of said first group, wherein said prediction residue associated with the current block comprises at least one sub-block of coefficients, and said first group of syntax elements comprises:
  a sub-block syntax element associated with said at least one sub-block of coefficients, said sub-block syntax element indicating whether at least one coefficient of the sub-block is non-null, and
  for each sub-block of coefficients of the prediction residue comprising at least one non-null coefficient, a significance syntax element for each coefficient of the sub-block, said significance syntax element indicating whether said coefficient is null or not, and
wherein said second group of syntax elements comprises a significance syntax element for each quantized prediction residue of the prediction residue.

* * * * *